(12) United States Patent
Jo et al.

(10) Patent No.: US 7,535,896 B2
(45) Date of Patent: May 19, 2009

(54) ROUTING CONTROL SYSTEM, ROUTING CONTROL DEVICE, AND ROUTING CONTROL METHOD

(75) Inventors: Manhee Jo, Yokohama (JP); Katsutoshi Nishida, Yokohama (JP); Takatoshi Okagawa, Yokosuka (JP); Noriteru Shinagawa, Yokosuka (JP)

(73) Assignee: NTT DoCoMo, Inc., Tokyo (JP)

( * ) Notice: Subject to any disclaimer, the term of this patent is extended or adjusted under 35 U.S.C. 154(b) by 849 days.

(21) Appl. No.: 10/689,702

(22) Filed: Oct. 22, 2003

(65) Prior Publication Data

US 2004/0136357 A1   Jul. 15, 2004

(30) Foreign Application Priority Data

Oct. 23, 2002   (JP)   ............ P2002-308770

(51) Int. Cl.
*H04L 12/50* (2006.01)
(52) U.S. Cl. .......... 370/360; 370/398; 370/395.31; 370/422
(58) Field of Classification Search .......... 370/395.3, 370/396, 395.31, 422, 398, 360
See application file for complete search history.

(56) References Cited

U.S. PATENT DOCUMENTS

| | | | |
|---|---|---|---|
| 5,381,403 A | | 1/1995 | Maher et al. |
| 6,069,895 A * | | 5/2000 | Ayandeh ............ 370/399 |
| 6,185,556 B1 * | | 2/2001 | Snodgrass et al. ......... 707/3 |
| 6,442,615 B1 | | 8/2002 | Nordenstam et al. |
| 6,496,510 B1 * | 12/2002 | Tsukakoshi et al. ...... 370/401 |
| 6,687,230 B1 * | | 2/2004 | Furutono et al. ......... 370/238 |
| 6,700,874 B1 * | | 3/2004 | Takihiro et al. ......... 370/248 |
| 6,760,314 B1 * | | 7/2004 | Iwata ............. 370/254 |
| 7,110,367 B2 * | | 9/2006 | Moriya ............ 370/256 |
| 7,167,474 B2 * | | 1/2007 | Sugai et al. ............ 370/392 |
| 7,209,450 B2 * | | 4/2007 | Yagyu et al. ............. 370/238 |

(Continued)

FOREIGN PATENT DOCUMENTS

EP          0 753 952          1/1997

(Continued)

OTHER PUBLICATIONS

M. Miller, pp. 44-47, "Implementing IPv6, Second Edition", 2000.

(Continued)

*Primary Examiner*—Ricky Ngo
*Assistant Examiner*—Dewanda Samuel
(74) *Attorney, Agent, or Firm*—Oblon, Spivak, McClelland, Maier & Neustadt, P.C.

(57) ABSTRACT

The routing control system 100 according to the present invention comprises a control server 1 as the control system, and routers 10-60 as the transfer system. The control server 1 receives the temporary routing control table which is transmitted from the routers 10-60, and stores this temporary routing control table in the routing control table DB 6 as the routing control table of the router which is the transmission source. This routing control table is updated as needed when a predetermined time has elapsed from the previous update. The control server 1 refers to the data in the routing control table DB 6 constructed in this way, and performs the routing control of packets which pass through each router 10-60 on the network.

11 Claims, 9 Drawing Sheets

U.S. PATENT DOCUMENTS

| | | | |
|---|---|---|---|
| 7,263,091 B1 * | 8/2007 | Woo et al. | 370/351 |
| 2002/0027887 A1 | 3/2002 | Moriya | |
| 2004/0085962 A1 * | 5/2004 | Sugai et al. | 370/392 |
| 2004/0105422 A1 * | 6/2004 | Sahni et al. | 370/351 |

FOREIGN PATENT DOCUMENTS

| | | |
|---|---|---|
| JP | 49-95502 | 9/1974 |
| JP | 8-265314 | 10/1996 |
| JP | 9-36910 | 2/1997 |
| JP | 11-17704 | 1/1999 |
| JP | 2001-24699 | 1/2001 |

OTHER PUBLICATIONS

"RFC 1058—Routing Information Protocol", pp. 1-25, Mar. 31, 2004.

* cited by examiner

ROUTING CONTROL SYSTEM, ROUTING CONTROL DEVICE, AND ROUTING CONTROL METHOD

BACKGROUND OF THE INVENTION

1. Field of the Invention

The present invention relates to a routing control system, routing control device, and routing control method.

2. Related Background Art

In a conventional packet communication system using a network, a router transfers packets based on the original routing control (routing) information created by itself. Each router existing in the system establishes a communication route of packets by exchanging routing control information with other routers. Because of this, the routing control function and the packet transfer function coexist in the router, and the router does not hold the entire routing control information on the packet communication system (e.g., reference is made to Nonpatent Document 1).

Also depending on the routing system, the router may recalculate its own routing control information each time router control related information is exchanged with adjacent routers, so in this case, considerable load is applied to the calculation of the routing control information (e.g., reference is made to Nonpatent Document 2).

[Nonpatent Document 1]

Mark Miller, Implementing IPv6, Second Edition, 2000, pp. 44-47).

[Nonpatent Document 2]

RFC 1058, Routing Information Protocol

SUMMARY OF THE INVENTION

The problems of a conventional packet communication system are: the routing control of packets on the network is complicated, and the expansion or reduction of the routing control function is difficult because the routing control function and the packet transfer function are not clearly separated. Also each router transfers packets based on the original routing control information created by itself, so the number of routers on the network and the operating status of each router are not be reflected accurately on the routing control of packets.

To accurately perform routing control of packets, it is possible that edge routers positioned at the edge of the network, such as a gateway router and access router, perform routing control comprehensively. With such a method, however, the processing load due to routing control and packet transfer concentrates on a part of the routers in the system, and [the processing load] cannot be efficiently distributed to each router.

With the foregoing in view, it is an object of the present invention to perform the routing control of packets efficiently and accurately by integrating routing control information which is scattered throughout the network.

To solve the above problems, the routing control system according to the present invention is a routing control system comprising a plurality of transfer devices for transferring packets on a network, and a control device for controlling a transfer route of these packets. The plurality of transfer devices further comprise generation means for generating a temporary routing control information (e.g. later mentioned temporary routing control table) for the packets, and transmission means for transmitting the temporary routing control information generated by the generation means to the control device. The control device further comprises reception means for receiving the plurality of temporary routing control information transmitted by the transmission means of the plurality of transfer devices, and control means for controlling the transfer route of the packets by using the plurality of temporary routing control information received by the reception means.

The routing control device according to the present invention is a routing control device which is connected to a plurality of transfer devices for transferring packets on a network and controls the transfer route of the packets, comprising reception means for receiving a plurality of temporary routing control information transmitted from the plurality of transfer devices, and control means for controlling the transfer route of the packets by using the plurality of temporary routing control information received by the reception means.

The routing control method according to the present invention comprises a generation step of generation means of a plurality of transfer devices generating temporary routing control information of packets, a transmission step of transmission means of the plurality of transfer devices transmitting the temporary routing control information generated in the generation step to a control device, a reception step of the reception means of the control device receiving the plurality of temporary routing control information transmitted in the transmission step, and a control step of control means of the control device controlling the transfer route of the packets by using the plurality of temporary routing control information received in the reception step.

According to the present invention, the temporary routing control information of the packets are generated by the plurality of transfer devices and are then sent to the control device. The control device controls the transfer route of the packets based on the plurality of temporary routing control information. In other words, according to the present invention, the temporary routing control information which the transfer devices (e.g. routers) scattered throughout the network hold are integrated in the control device, so the routing control function and the packet transfer function in the routing control system are clearly separated into the control device and the transfer device.

This makes it easy to perform the routing control of packets within a network and to expand or reduce the functions related to the routing control. Also the control device can perform the routing control of packets with comprehensively knowing the number of transfer devices on the network and the operating status of each transfer device by referring to the temporary routing control information integrated from each transfer device. As a result, compared with the case of each transfer device individually performing routing control, the routing control of packets can be performed efficiently and accurately.

In the routing control system according to the present invention, it is preferable that the transmission means of the transfer device transmits the temporary routing control information to the control device when the temporary routing control information of the packets is changed or regenerated.

Also in the routing control method according to the present invention, it is preferable that the transmission means of the transfer device transmits the temporary routing control information to the control device in the transmission step when the temporary routing control information of the packets is changed or regenerated.

According to the present invention, the temporary routing control information is transmitted from the transfer device to the control device not only when the temporary route information of the packets is generated, but also when this temporary routing control information is changed or regenerated.

Because of this, the same temporary routing control information is always held in the transfer device and the control device, even when the temporary routing control information generated once is updated by the transfer device. Therefore the control device grasps the dynamically changing temporary routing control information accurately in real-time, and can reflect [the temporary routing control information] to the routing control processing quickly and flexibly. As a result, the routing control of packets can be performed efficiently and accurately.

Also in the routing control system according to the present invention, it is preferable that the control device further comprises reception notification means for notifying the reception of the temporary routing control information to the transfer device which is the transmission source of the temporary routing control information, when the temporary routing control information is transmitted.

Also it is preferable that the routing control method according to the present invention further comprises a reception notification step of the control device notifying the reception of the temporary routing control information to the transfer device which is the transmission source of the temporary routing control information, when the temporary routing control information is transmitted.

According to the present invention, the reception of the temporary routing control information by the control device is notified to the transfer device which is the transmission source of the temporary routing control information, when the temporary routing control information is transmitted from the transfer device to the control device. By receiving this notification the transfer device can easily confirm that the temporary routing control information, [which the transfer device] itself generated and transmitted, is certainly reflected to the routing control of packets. At the same time, the transfer device can easily confirm that it is unnecessary to retransmit the temporary routing control information.

In the routing control system according to the present invention, it is preferable that the control device further comprises update means for updating a first temporary routing control information received by the reception means to a second temporary routing control information newly received by the reception means when a predetermined time elapsed after the first temporary routing control information is stored, and then storing the second temporary routing control information to the storage means as the routing control information (e.g. later mentioned routing control table)

In the routing control method according to the present invention, it is preferable that the control device further comprises an update step of updating a first temporary routing control information received in the reception step to a second temporary routing control information newly received in the reception step when a predetermined time elapsed after the first temporary routing control information is stored, and then storing the second temporary routing control information in the storage means as the routing control information.

According to the present invention, when a predetermined time has elapsed after the received first temporary routing control information is stored and the second temporary routing control information is newly received from the same transfer device, the conventional first temporary routing control information is updated to the second temporary routing control information. And this second temporary routing control information is stored as the routing control information. In other words, if the temporary routing control information is too frequently transmitted from the transfer device, [the control device] waits for a predetermined time and does not update the routing control information intentionally. Therefore even if the transfer device changes and sends the temporary routing control information too frequently, the temporary routing control information is not changed at the control device side every time. By this, in the control device, frequent changes of routing control information in a short period of time is suppressed and the consistency of the routing control information is maintained. As a result, the routing control of packets can be performed at high accuracy.

In the routing control system according to the present invention, the control device may further comprise update notification means for notifying the transfer device of the update of the routing control information (corresponding to the later mentioned confirmation message) when the routing control information is updated by the update means.

In the routing control method according to the present invention, the control device may further comprise an update notification step for notifying the transfer device of the update of the routing control information (corresponding to the later mentioned confirmation message) when the routing control information is updated in the update step.

According to the present invention, the update of the routing control information is notified to the transfer device when the routing control information is updated by the control device. The transfer device can easily and quickly recognize that the transmitted temporary routing control information is reflected to the routing control by receiving this notification. Based on this recognition, the transfer device can replace the conventional temporary routing control information with the new routing control information to use it as the routing control information.

The present invention will more fully be understood from the detailed description given herein below and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DESCRIPTION OF THE PREFERRED EMBODIMENTS

First Embodiment

A first embodiment of the present invention will now be described with reference to the accompanying drawings.

Figure 1:
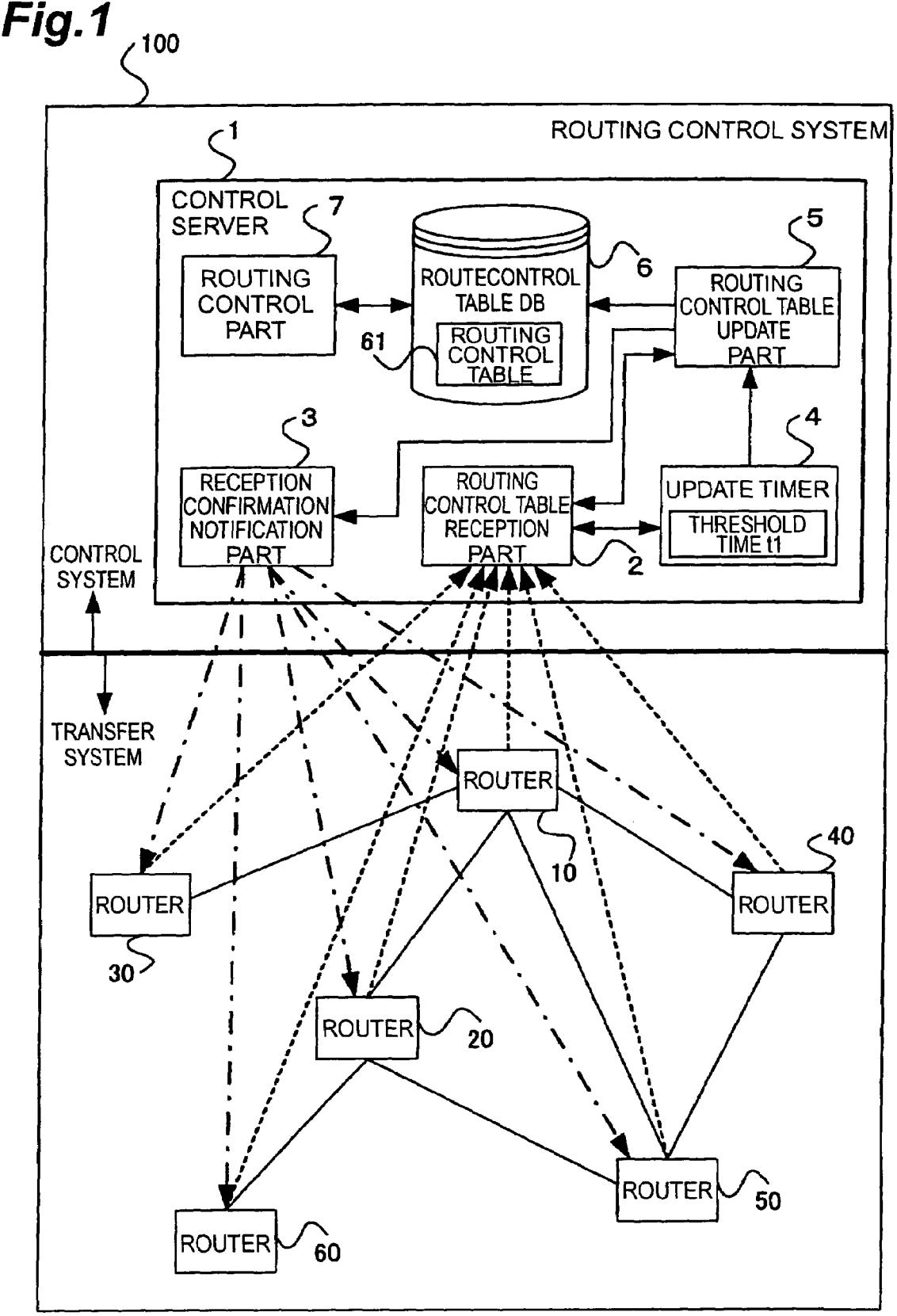
FIG. 1 is a diagram depicting a general configuration of the routing control system and a functional configuration of the control server according to the first embodiment.

FIG. 1 is a diagram depicting a general configuration of the routing control system 100 according to the present invention and the functional configuration of the control server 1. As FIG. 1 shows, the routing control system 100 is comprised of a control server 1 (corresponds to the control device) which belongs to the control system, and routers 10-60 (corresponds to the transfer device) which belongs to the transfer system.

The control system and the transfer system are clearly separated by the control server 1 and the routers 10-60, which are physical elements of the routing control system 100. The control server 1 and each router 10-60 can mutually transmit/receive data via a wired link. The routers 10-60 can mutually transmit/receive data with another router via a wired link or a wired link and a router.

As FIG. 1 shows, the control server 1 comprises a routing control table reception part 2 (corresponds to the reception means), reception confirmation notification part 3 (corresponds to the reception notification means), update timer 4, routing control table update part 5 (corresponds to the update means), routing control table DB (Data Base) 6, and routing control part 7 (corresponds to the control means). Each part is connected to a bus so that signal, according to the function of the respective part, can be input/output.

Here the routing control table corresponds to the routing control information, and the temporary routing control table corresponds to the temporary routing control information.

The routing control table reception part 2 receives the routing control table transmitted from each router 10-60. The routing control table reception part 2 outputs each one of the received routing control tables to the routing control table update part 5 along with the identification information of the router which is the transmission source thereof. Detecting the completion of the construction of the routing control table on an arbitrary router, the routing control table reception part 2 transmits the confirmation message on this detection to the router. Here the construction of the routing control table refers to newly "storing" the temporary routing control table to the later mentioned routing control table DB 6 as the routing control table, or to "updating" the conventional temporary routing control table to a new temporary routing control table as the routing control table.

Receiving the routing control table from the routing control table reception part 2, the reception confirmation notification part 3 transmits the message on this reception to the router which is the transmission source of the temporary routing control table.

At the point when the routing control table reception part 2 received the confirmation message from the router, the update timer 4 starts keeping the time elapsed from the reception. The update timer 4 holds the threshold time t1 (e.g. 45 seconds), and as soon as the elapsed time reaches the threshold time t1, [reaching the time up] is notified to the routing control table update part 5.

The routing control table update part 5 acquires the temporary routing control table from the routing control table reception part 2. The routing control table update part 5, which is notified of the time up from the update timer 4, constructs the routing control table DB 6 by storing or updating the acquired temporary routing control table as the routing control table. Also the routing control table update part 5 instructs the routing control table reception part 2 to transmits the above mentioned confirmation message when construction of the routing control table DB 6 is completed.

In the routing control table DB 6, the temporary routing control table which is input from the routing control table update part 5, is stored as the routing control table in correspondence with the identification information of the router.

Figure 2:
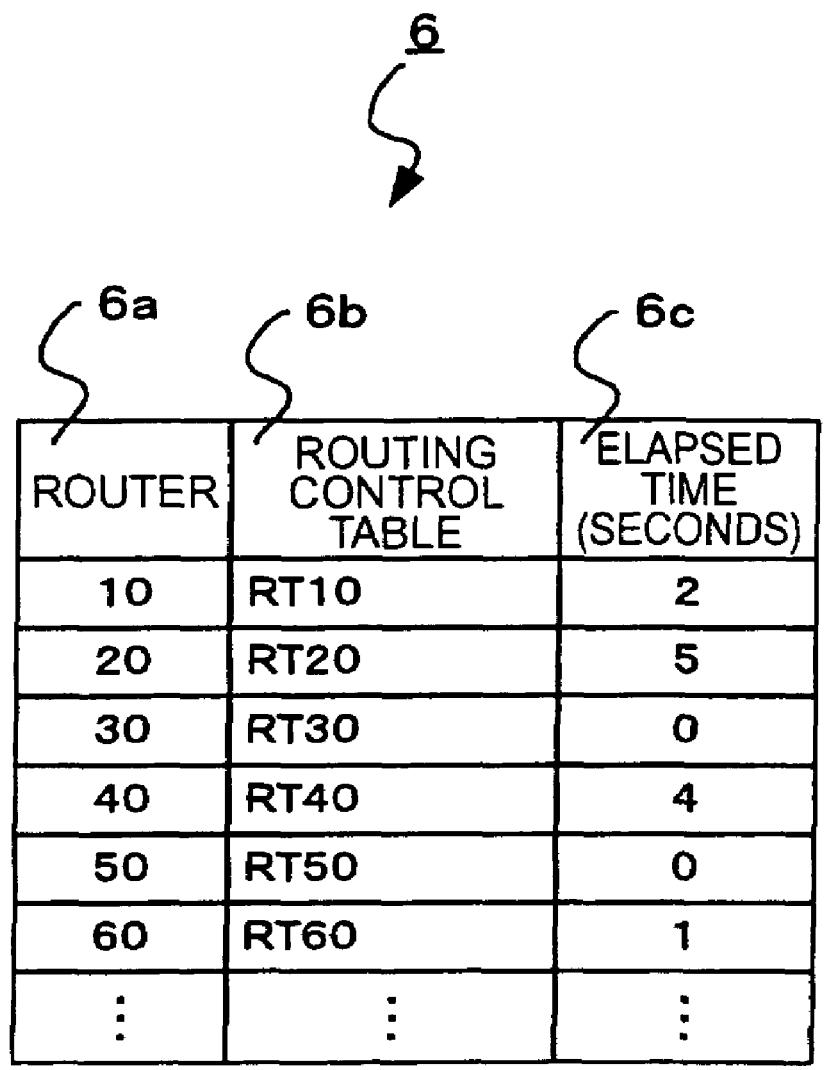
FIG. 2 is a diagram depicting an example of data storage of the routing control table DB.

Here FIG. 2 shows an example of data storage in the routing control table DB 6. As FIG. 2 shows, the routing control table DB 6 is comprised of the router storage area 6a, routing control table storage area 6b, and elapsed time storage area 6c.

In the router storage area 6a, information which uniquely identifies the routers 10-60 in the routing control system 100 (e.g. IP address, MAC address) is stored. In the present embodiment, for the identification of each router, numerals (10, 20, 30, . . . ) identical with the reference numerals in the drawings are shown as an example to simplify [description].

In the routing control table storage area 6b, the temporary routing control table acquired from the routing control table update part 5 is stored and mark updatable as the routing control table. This routing control table is a routing table that the corresponding router calculates considering such routing related information as topology, adjacent nodes and link cost. In FIG. 2, the routing control table corresponding to the router 10 is written as RT (Routing Table) 10, and the routing control tables corresponding to the routers 20, 30, . . . are written as RT 20, RT 30, . . . respectively.

In the elapsed time storage area 6c, the elapsed time from the transmission of the above mentioned confirmation message (e.g. 2 sec., 5 sec., 0 sec., . . . ) is stored in correspondence with the identification information of the router. If this elapsed time exceeds, the threshold time t1 of the update timer 4, the routing control table DB 6 is constructed by the routing control table update part 5, and when the next confirmation message is transmitted, this elapsed time is reset to "0". This construction processing is performed for all the routers that independently transmitted the temporary routing control table.

The routing control part 7 refers to the updatable routing control table in the routing control table DB 6 and the identification information of the router, and determines the optimum routers for the packets on the network 90 to pass through, and the passing sequence thereof. By this, the routing control of the packets can be performed.

Figure 3:
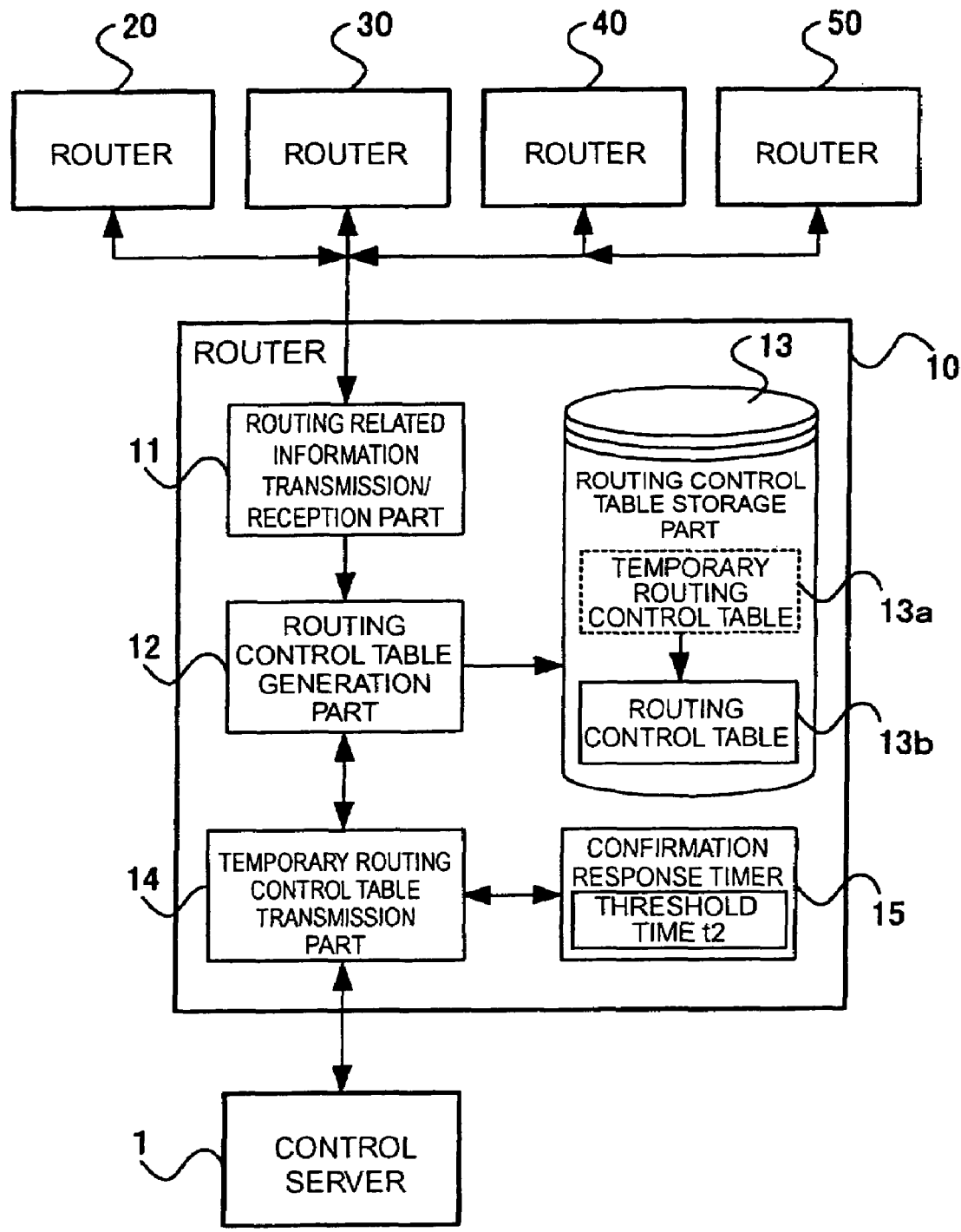
FIG. 3 is a block diagram depicting a functional configuration of the router according to the first embodiment.

FIG. 3 is a block diagram depicting a functional configuration of the router 10. As FIG. 3 shows, the router 10 comprises the routing related information transmission/reception part 11, routing control table generation part 12 (corresponds to the generation means), routing control table storage part 13, temporary routing control table transmission part 14 (corresponds to the transmission means), and confirmation response timer 15. Each part is connected via a bus so that signals, according to the function of each part, can be input/output.

The routing related information transmission/reception part 11 receives the routing related information of each router from the adjacent routers 20, 30, 40 and 50, and outputs this information to the routing control table generation part 12. Here the routing related information is information concerning the network where the routing control system 100 is constructed, and is used for generating the routing control table. The routing related information is, for example, network topology, adjacent node of a router, link cost, etc.

The routing control table generation part 12 generates the temporary routing control table based on the routing related information which is input via the routing related information transmission/reception part 11, and stores this table in the routing control table storage part 13. The routing control table generation part 12 also updates the temporary routing control table 13a in the routing control table storage part 13 to the routing control table 13b when the confirmation message for the transmission of the temporary routing control table is received within a predetermined time from the time of transmission.

The routing control table storage part 13 holds the temporary routing control table which is input from the routing control table generation part 12 and mark updatable. After the temporary routing control table being updated by the routing control table generation part 12, the routing control table storage part 13 stores the updated temporary routing control table into the routing control table.

The temporary routing control table transmission part 14 transmits the routing control table which is input from the routing control table generation part 12 to the control server 1 along with the identification information of the router 10. The temporary routing control table transmission part 14 receives the confirmation message from the control server 1. Also the temporary routing control table transmission part 14 monitors the elapsed time notified by the confirmation response timer 15, and instructs the update of the temporary routing control table to the routing control table generation part 12 if the confirmation message is received within the later mentioned threshold time t2.

Detecting that the temporary routing control table transmission part 14 transmitted the temporary routing control table, the confirmation response timer 15 starts clocking the time which elapsed from transmission time. The confirmation response timer 15 holds the threshold time t2 (e.g. 15 seconds), and when the elapsed time reaches the threshold time t2, [reaching the threshold time] is notified to the temporary routing control table transmission part 14 along with the elapsed time.

Configuration of the router 10 was described above. The other routers 20-60 have the same basic configuration as the router 10, although the installed location is different, so the illustration and the detailed description of the configuration thereof will be omitted.

Now the operation of the routing control system 100 will be described. Also each step of the routing control method according to the present invention will be described.

At first, the process of routing control table provisioning, which is executed by each router constituting the routing control system 100, will be described with reference to FIG. 4. In the present embodiment, the process of routing control table provisioning, executed in the router 10 which has the largest number of adjacent routers, will be described as an example, but the process of routing control table provisioning can also be executed of course in the routers 20-60.

In S1, the router 10 waits for the transmission of the routing related information. When the routing related information transmitted from the adjacent router 20, 30, 40 or 50 is received by the routing related information transmission/reception part 11 of the router 10 (S1: Yes), the temporary routing control table is generated by the routing control table generation part 12 based on the routing related information of each adjacent router. This generation includes the change of content of the already generated temporary routing control table, and the generation (regeneration) of the temporary routing control table on the same router. The generated temporary routing control table is temporarily held in the routing control table storage part 13 (S2).

In S3, the temporary routing control table generated in S2 is transmitted to the control server 1, along with the identification information of the router 10, by the temporary routing control table transmission part 14.

At the same time with the transmission of the temporary routing control table, the clocking of the time of the confirmation response timer 15 is started (S4).

The temporary routing control table transmission part 14 waits for the transmission of the confirmation message from the control server 1 after the start of the clocking of time (S5). This confirmation message is ACK (ACKnowledgment) which indicates that the control server 1 completed the construction of the routing control table, and the router 10 updates the temporary routing control table at that point to the routing control table by receiving this confirmation message. From this point, the control server 1 can perform the routing control of the router 10.

When the confirmation message transmitted from the control server 1 is received by the temporary routing control table transmission part 14 of the router 10 (S5: Yes), the temporary routing control table currently stored in the routing control table storage part 13 is stored as the routing control table by the routing control table generation part 12 (S6). From this point, the control server 1 has the router 10 execute routing control. After the processing in S6 completes, the router 10 returns to S1 to wait for further transmission of the routing related information, and the processing after S1 is executed again.

On the other hand, When the above confirmation message is not received by the temporary routing control table transmission part 14 of the router 10 in S5 (S5: No), the elapsed time of the confirmation response timer 15 is tested (S7). If the elapsed time of the confirmation response timer 15 does not exceed the threshold time t2 as the result of this test, (if it is not time out), [processing] returns to S5, and the above mentioned process after S5 is executed again.

If the confirmation message is not received (S5: No) and the elapsed time of the confirmation response timer 15 exceeded the threshold time t2 (S7: Yes), then [processing] returns to S1 and processing after S1 is executed again.

After executing the above mentioned process of routing control table provisioning, the router 10 stores the temporary routing control table as the routing control table only when the confirmation message of the temporary routing control table transmitted to the control server 1 is replied to without waiting for the elapse of the threshold time t2. By this, the same routing control table is held in both the router 10 and the control server 1. Therefore, accurate routing control immediately reflecting the operating status of the routers 10 can be implemented.

Now the process of routing control table DB construction, which is executed by the control server 1, will be described with reference to FIG. 5.

In T1, the control server 1 waits for the reception of the routing control table by the router 10. When the routing control table transmitted from the router 10 in S3 in FIG. 4 is received by the routing control table reception part 2 along with the identification of the router 10 which is the transmission source thereof (T1: Yes), [processing] moves to T2.

In T2, the elapsed time of the update timer 4 is tested when the clock processing of the update timer 4 has started. In other words, at the first cycle of the process of routing control table provisioning, the clocking of the update timer 4 has not yet started, so the processing of T2 is omitted, and [processing]

moves to T3. At the second or later cycle, the clocking of the update timer 4 has already started in the later mentioned T5, so the routing control table update part 5 tests the elapsed time of the update timer 4.

If the elapsed time of the update timer 4 exceeds the threshold time t1 (if it is time out) as a result of the test, the routing control table update part 5 stores or updates the temporary routing control table received in T1 as the routing control table (T3). For example, if the routing control table corresponding to the router 10 is not stored in the routing control table DB 6, the storage area of the routing control table is created, and [the routing control table] is stored. If the routing control table corresponding to the router 10 has already been stored in the routing control table DB 6, the temporary routing control table received in T1 is stored as a new routing control table, instead of the routing control table. At the completion of storing or updating processing, the control server 1 becomes a status where the routing control of packets can be executed.

On the other hand, If the elapsed time of the update timer 4 does not exceed the threshold time t1 when the control server 1 transmitted the reception confirmation of the temporary routing control table (T2: No), [processing] returns to T1, and processing after T1 is executed again.

In T4, when the routing control table reception part 2 detects the storage or update of the routing control table, the confirmation message is transmitted to the router 10 which is the transmission source of the temporary routing control table. This confirmation message is received by the temporary routing control table transmission part 14 of the router 10 in S5 shown in FIG. 4.

When the clocking of the update timer 4 starts at the same time as the transmission of the confirmation message (T5), [processing] returns to T1, where the control server 1 waits for further transmission of the temporary routing control table, and processing after T1 is executed again.

By the control server 1 executing the above mentioned process of routing control table DB construction, the plurality of routing control tables generated by the routers 10-60 are integrated into the routing control table DB 6. The routing control part 7 of the control server 1 performs the routing control of packets referring to this routing control table DB 6. In other words, the control server 1 knows the number of equipment on the network and performs centralized management of the operating status, so that appropriate packet transfer processing can be instructed to an appropriate router according to the contention condition of the system and the movement condition of a destination mobile unit of the packets. By this, network management considering QoS (Quality of Service), such as contention control, or advanced hand-off functions, can be implemented without drastic change in the configuration of conventional routers.

If the temporary routing control table is transmitted from a router when sufficient time has not elapsed since storing of the new routing control table or since a previous update, it is suspected that this router has been changing the routing control table too frequently. In such a case, the control server 1 does not update the routing control table DB 6 or transmit the confirmation message to the router. In other words, if the time-based change of the routing control table is too frequent, then information actually being used for routing control is settled after a predetermined time has elapsed. By this, a more accurate routing control, where the fluctuation of routing related information is minimized, becomes possible.

Second Embodiment

The second embodiment of the present invention will now be described with reference to the accompanying drawings.

In the first embodiment, the control server of the control system has the update timer of the routing control table. Whereas in the present embodiment, the router of the transfer system has the update timer of the routing control table, so that the unnecessary transmission/reception of the routing control table between the control server and the router is decreased, and the communication load in the routing control system and the processing load of the control server are decreased.

The routing control system of the present embodiment will now be described.

Figure 6:
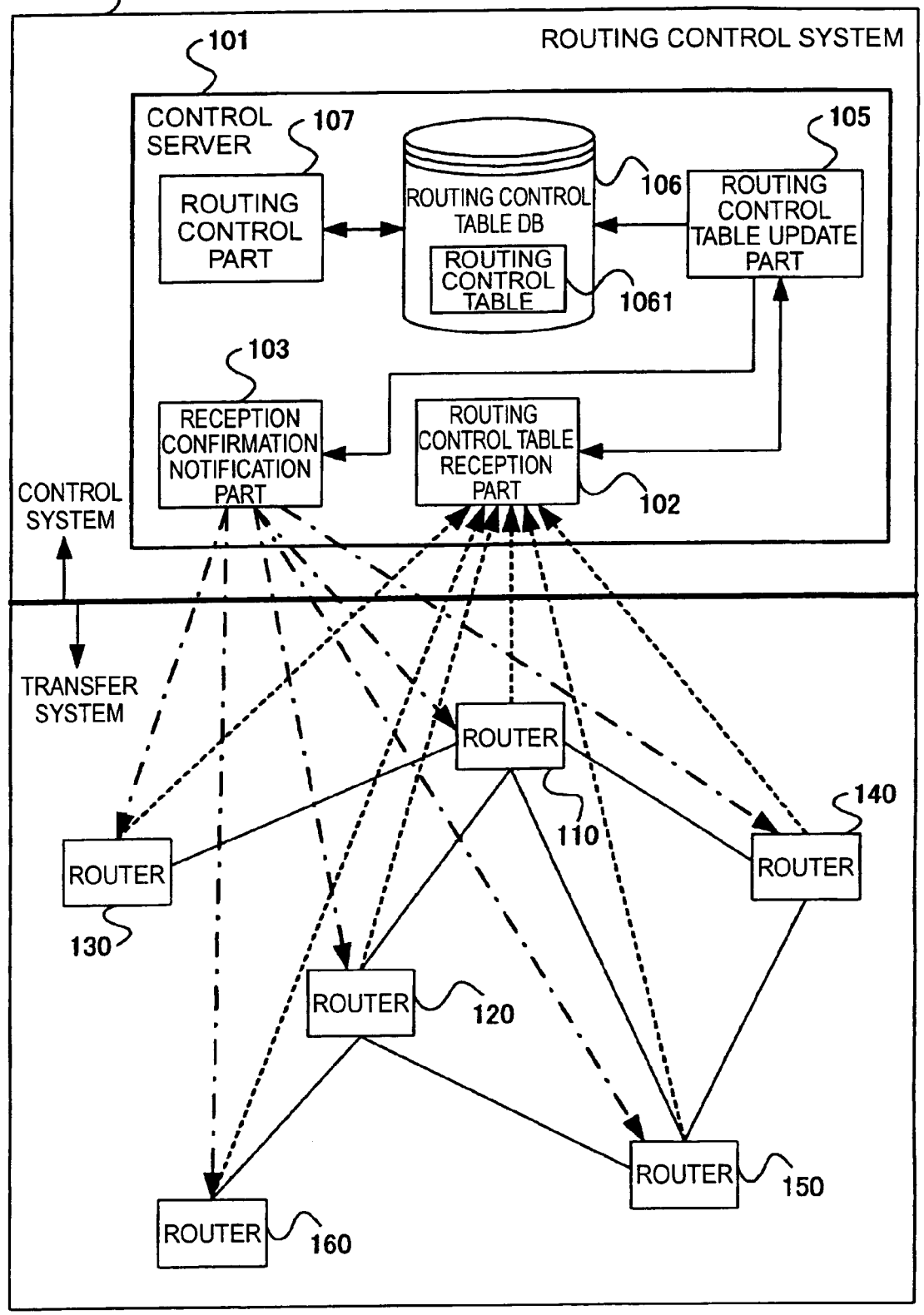
FIG. 6 is a diagram depicting a general configuration of the routing control system and a functional configuration of the control server according to the second embodiment.

FIG. 6 is a diagram depicting a general configuration of the routing control system 200 according to the present invention and a functional configuration of the control server 101. As FIG. 6 shows, the routing control system 200 is comprised of a control server 1 (corresponds to the control device) which belongs to the control system, and routers 110-160 (corresponds to the transfer device) which belongs to the transfer system.

The control system and the transfer system are clearly separated by the control server 101 and the routers 110-160, which are the physical elements of the routing control system 200. The control server 101 and each router 110-160 can mutually transmit/receive data via a wired link. The routers 110-160 can mutually transmit/receive data with other routers via wired links or wired links and routers.

FIG. 6 is a block diagram depicting a functional configuration of the control server according to the second embodiment. The configuration of this control server is the same as the configuration of the control server 1 described in the first embodiment, except that [this control server] does not comprise the update timer as the clocking means. Therefore each element is denoted with a similar numeral (number whereby the last digit is the same) [as the first embodiment], and description thereof is omitted.

In other words, as FIG. 6 shows, the control server 101 comprises a routing control table reception part 102 (corresponds to the reception means), reception confirmation notification part 103 (corresponds to the reception notification means), routing control table update part 105 (corresponds to the update means), routing control table DB 106, and routing control part 107 (corresponds to the control means). Each part corresponds to the routing control table reception part 2, reception confirmation notification part 3, routing control table update part 5, routing control table DB 6, and routing control part 7 shown in FIG. 1, respectively.

Figure 7:
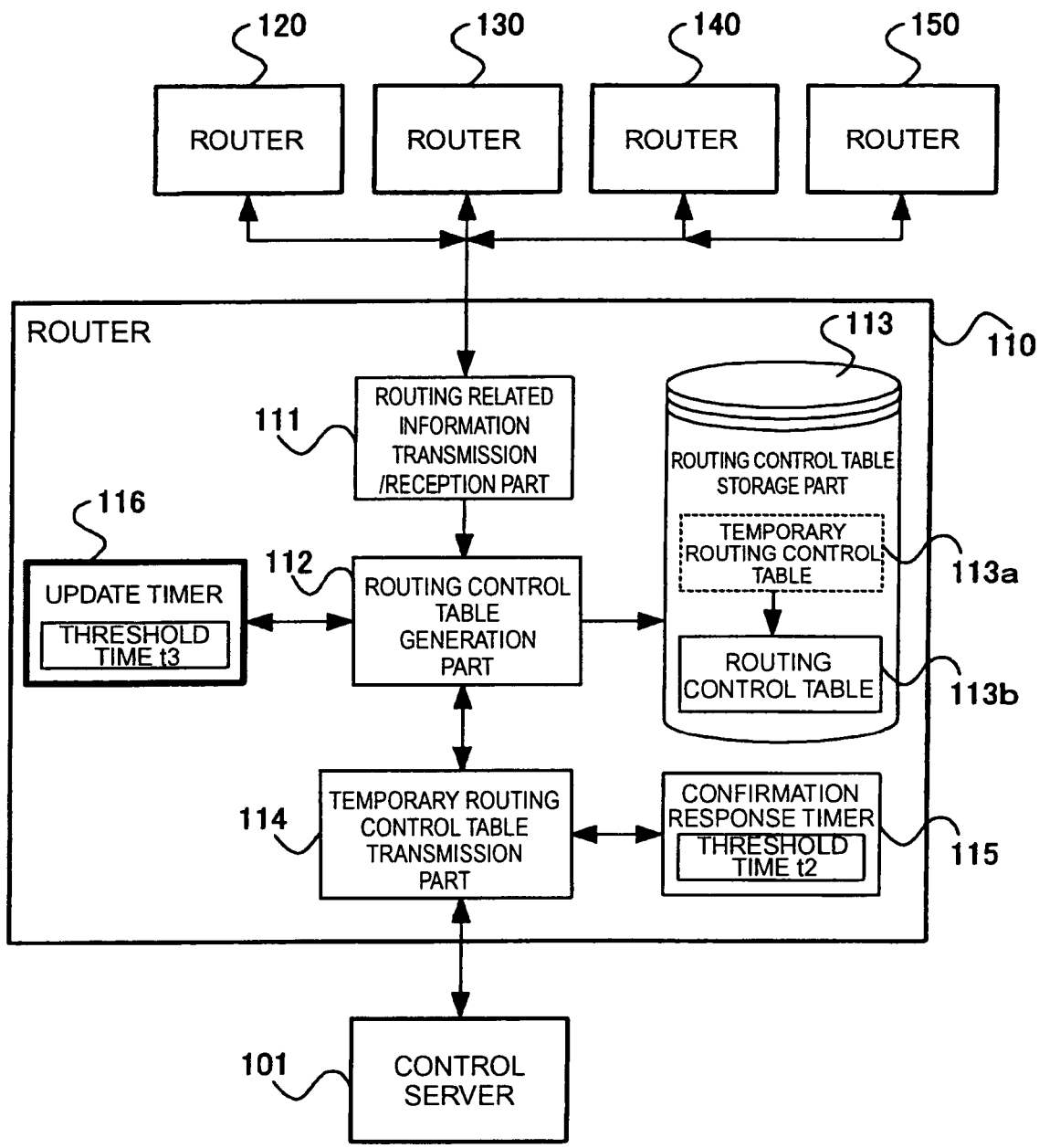
FIG. 7 is a block diagram depicting a functional configuration of the router according to the second embodiment.

FIG. 7 is a block diagram depicting a functional configuration of the router 110 according to the second embodiment. The configuration of the router 110 is similar to the configuration of the router 10 described in the first embodiment, so each element is denoted with a similar numeral (number whereby the last digit is the same) [as the first embodiment], and description thereof is omitted, and only differences from the first embodiment will be described.

As FIG. 7 shows, the router 110 comprises a routing related information transmission/reception part 111, routing control table generation part 112 (corresponds to the generation means), routing control table storage part 113, temporary routing control table transmission part 114 (corresponds to the transmission means), confirmation response timer 115, and update timer 116. Each part is connected to a bus such that signals, according to the function of each part, can be input/output. Each part, other than the update timer 116, corresponds to the routing related information transmission/reception part 11, routing control table generation part 12, routing control table storage part 13, temporary routing control table transmission part 14 and confirmation response timer 15, respectively.

The update timer 116 (block indicated by the bold line in FIG. 7), which is an element unique to the router in the present embodiment, starts the clocking of elapsed time from the storage time at the point when the temporary routing control table is stored in the routing control table storage part 113 as the routing control table. The update timer 116 holds the threshold time t3 (e.g. 45 seconds), and notifies [reaching the setup up] to the routing control table generation part 112 when the elapsed time reaches the threshold time t3.

The configuration of the router 110 was described above. The other routers 120-160 have the same basic configuration as the router 110, although the installed locations are different. Therefore illustration and detailed description of the configuration thereof will be omitted.

Figure 8:
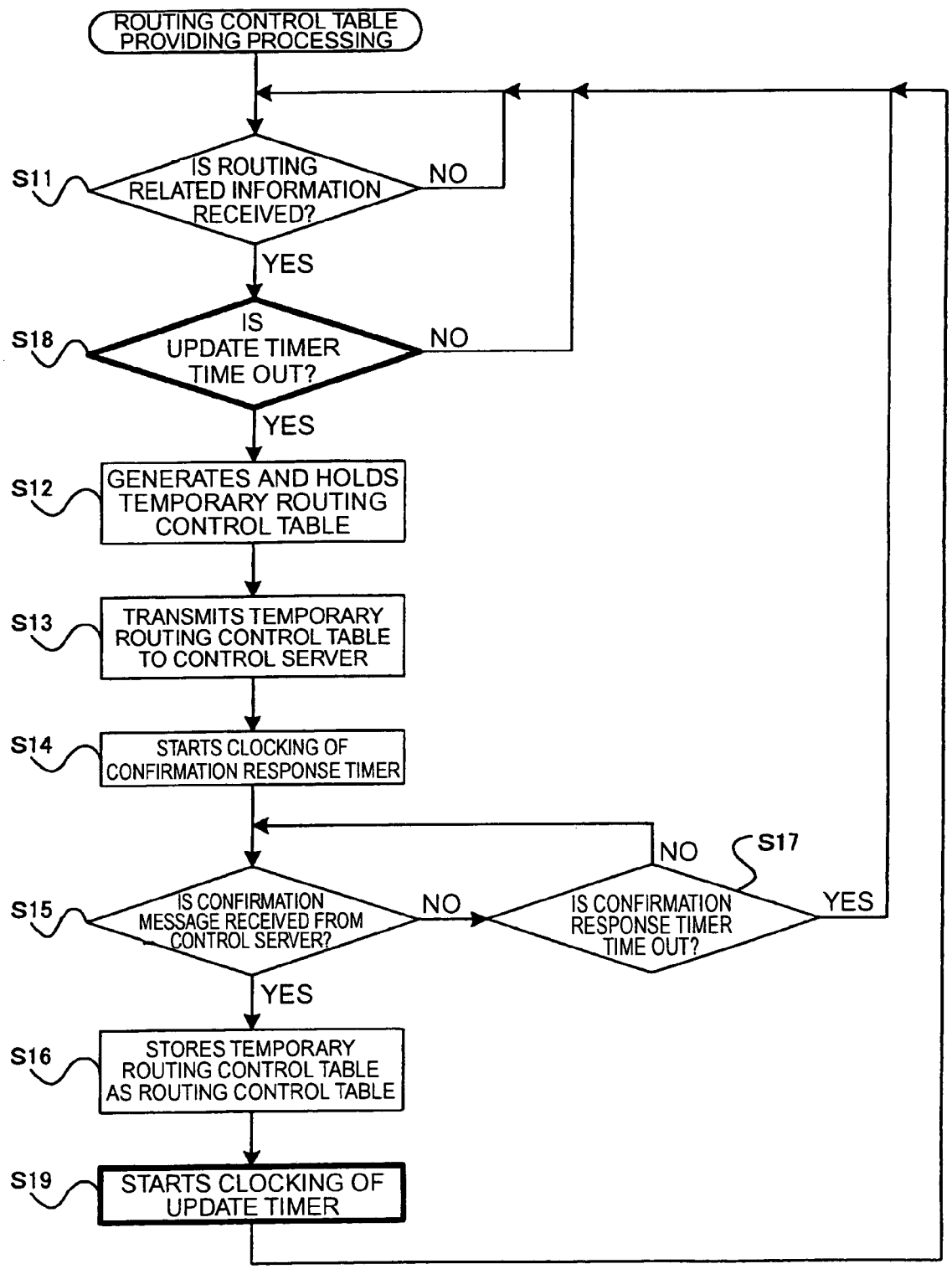
FIG. 8 is a flow chart depicting the provisioning process of the routing control table according to the second embodiment.
Figure 9:
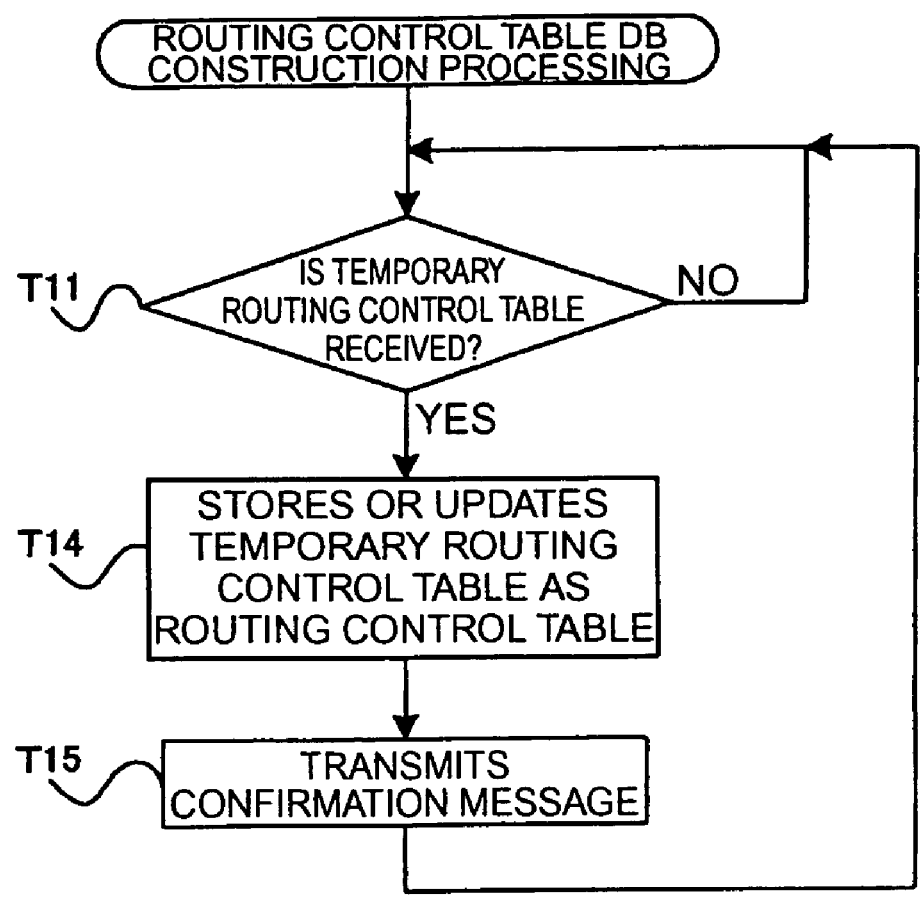
FIG. 9 is a flow chart depicting the process of the routing control table DB construction according to the second embodiment.

Now the operation of the routing control system 200 will be described with reference to FIG. 8 and FIG. 9. Also each step of the routing control method according to the present invention will be described.

Figure 4:
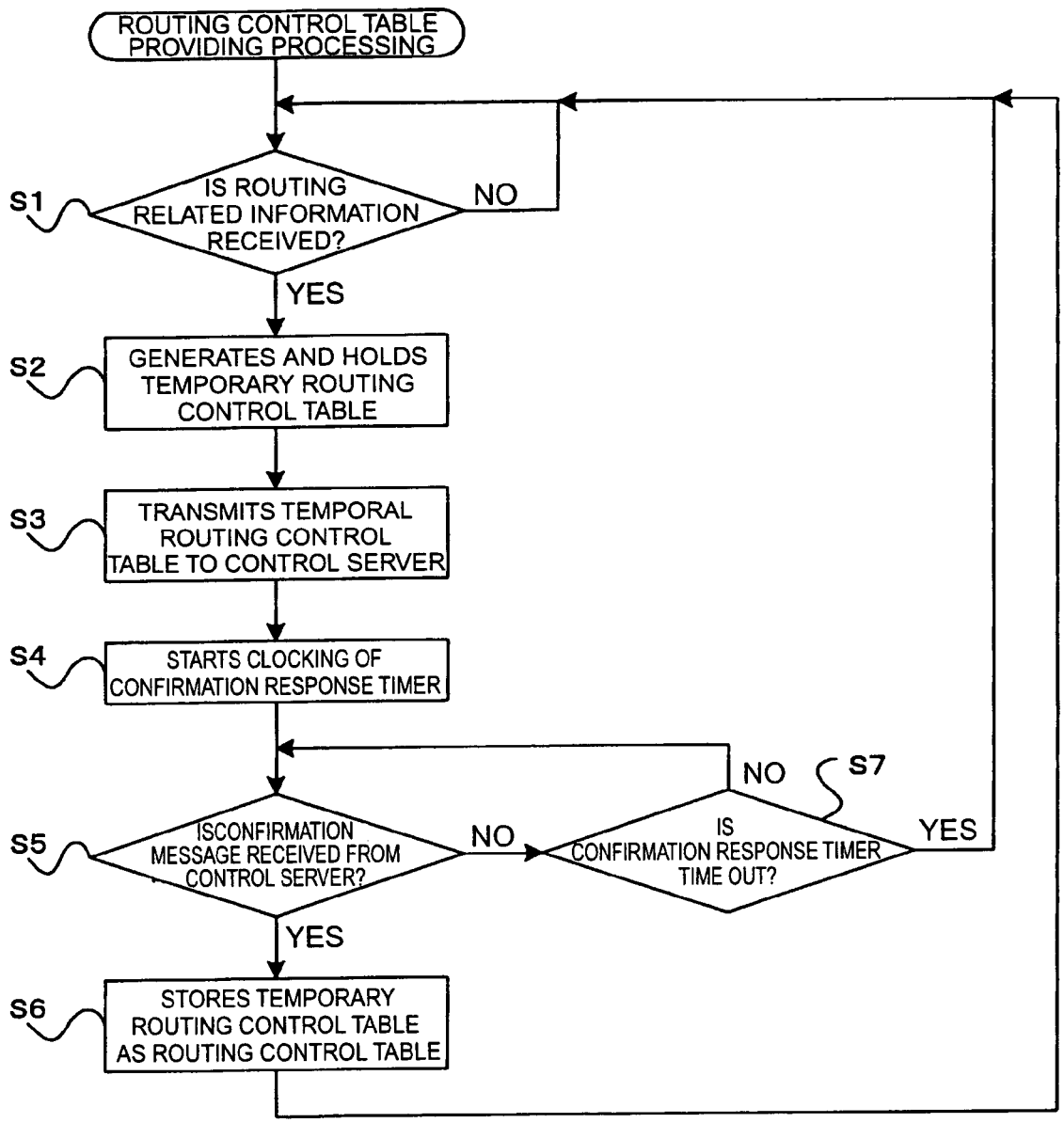
FIG. 4 is a flow chart depicting the routing control table providing processing according to the first embodiment.

At first, the process of the routing control table provisioning executed by the router 110, is basically the same as the process of the routing control table provisioning described in the first embodiment (see FIG. 4). Specifically, each step S11-S17 in FIG. 8 corresponds to each step S1-S7 in FIG. 4, respectively.

Now step S18 and S19, unique to the router in the present embodiment (processing indicated by the bold line in FIG. 8), will be described. In S18, the elapsed time of the update timer 116 is tested when the clocking processing of the update timer 116 has already been started. In other words, at the first cycle of the process of the routing control table provisioning, since the clocking of the update timer 116 has not started yet, processing in S18 is omitted, and [processing] moves to S12. At the second or later cycle, the clocking of the update timer 116 has already started in the later mentioned S19, so the routing control table generation part 112 tests the elapsed time of the update timer 116.

If the elapsed time of the update timer 116 exceeds the threshold time t3 (if it is time out) as a result of the test, the routing control table generation part 112 generates and holds the temporary routing control table based on the routing related information received in S11 (S12). Generation includes the change of content of the temporary routing control table generated once, or the generation (regeneration) of the temporary routing control table on the same router.

On the other hand, If the elapsed time of the update timer 116 does not exceed the threshold time t3 (S18: No), [processing] returns to S11 and processing after S11 is executed again.

In S19, the clocking of the update timer 116 starts at the same time with the update of the temporary routing control table, and the router 110 returns to S11 to wait for further transmission of routing related information, and processing after S11 is executed again.

Figure 5:
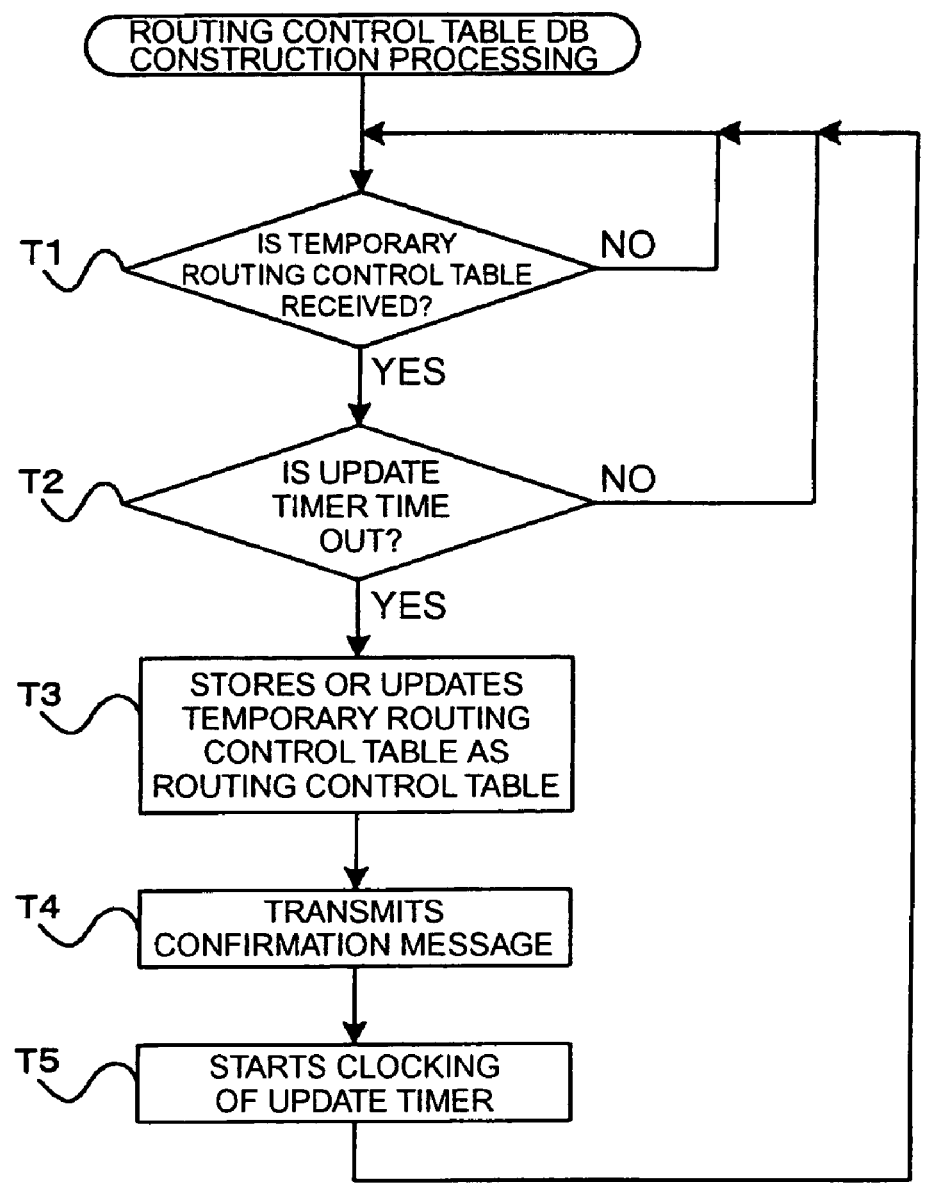
FIG. 5 is a flow chart depicting the process of the routing control table DB construction according to the first embodiment.

The process of the routing control table DB construction to be executed by the control server 101 is basically the same as the process of the routing control table DB construction processing described in the first embodiment (see FIG. 5). Specifically, each step T11, T14 and T15 in FIG. 9 corresponds to each step T1, T3 and T4 shown in FIG. 5, respectively. In other words, the control server 101 in the present embodiment uses all the received temporary routing control tables for the construction of the routing control table DB 6 regardless the elapsed time from the transmission of the confirmation message.

As described above, according to the routing control system 200 in the second embodiment, the generation and transmission of the temporary routing control table by the router are not sequentially executed for all the received routing related information, but are started when a predetermined time elapses from the update of the temporary routing control table. Therefore a temporary routing control table which is not used for the construction of the routing control table DB 106, is never transmitted from the router to the control server 101. As a result, the communication load in the routing control system 200 is decreased. The control server 101 has a simple configuration since the update timer is not necessary, and the processing load due to clocking processing can be decreased.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A routing control system, comprising:
a plurality of routing devices for transferring packets on a network, and a control server for controlling a transfer route of said packets,
wherein each of said plurality of routing devices includes
routing related information reception means for receiving routing related information from an adjacent routing device;
generation means for generating a temporary routing control table based on the received routing related information; and
transmission means for transmitting the temporary routing control table generated by said generation means to said control server, and
said control server includes
reception means for receiving a plurality of the temporary routing control tables transmitted by the transmission means of said plurality of routing devices;
control means for controlling the transfer route of said packets by using the plurality of the temporary routing control tables received by said reception means; and
reception notification means for notifying the reception of said temporary routing control table to the routing device which is the transmission source of said temporary routing control table, when said temporary routing control table is transmitted.

2. A routing control system, comprising:
a plurality of routing devices for transferring packets on a network, and a control server for controlling a transfer route of said packets,
wherein each of said plurality of routing devices includes
routing related information reception means for receiving routing related information from an adjacent routing device;
generation means for generating a temporary routing control table based on the received routing related information; and transmission means for transmitting the temporary routing control table generated by said generation means to said control server, and said control server includes reception means for receiving a plurality of the temporary routing control tables transmitted by the transmission means of said plurality of routing devices;

control means for controlling the transfer route of said packets by using the plurality of the temporary routing control tables received by said reception means;

update means for updating a first temporary routing control table stored in the control server with a second temporary routing control table; and reception notification means for transmitting a confirmation of receipt of the second temporary routing control table to the routing device that transmitted the first temporary routing control table and the second temporary routing control table, when the first temporary routing control table is updated.

3. The routing control system according to claim 2, wherein each of the plurality of routing devices further includes confirmation reception means for receiving the confirmation from the control server, wherein the generation means updates the first temporary routing control table stored in the routing device with the second temporary routing control table, when the confirmation is received by the confirmation reception means.

4. A routing control system, comprising:

a plurality of routing devices for transferring packets on a network, and a control server for controlling a transfer route of said packets, wherein each of said plurality of routing devices includes routing related information reception means for receiving routing related information from an adjacent routing device;

generation means for generating a temporary routing control table based on the received routing related information; and transmission means for transmitting the temporary routing control table generated by said generation means to said control server, and said control server includes reception means for receiving a plurality of the temporary routing control tables transmitted by the transmission means of said plurality of routing devices;

control means for controlling the transfer route of said packets by using the plurality of the temporary routing control tables received by said reception means;

update timer means for determining an elapsed time since a first temporary routing control table was stored in the control server; and update means for updating the first temporary routing control table stored in the control server with a second temporary routing control table when the elapsed time exceeds a predetermined threshold time.

5. A routing control system, comprising:

a plurality of routing devices for transferring packets on a network, and a control server for controlling a transfer route of said packets, wherein each of said plurality of routing devices includes routing related information reception means for receiving routing related information from an adjacent routing device;

generation means for generating a temporary routing control table based on the received routing related information;

update timer means for determining an elapsed time since a first temporary routing control table was stored in the routing device; and transmission means for transmitting the temporary routing control table generated by said generation means to said control server, the transmission means transmitting a second temporary routing control table to the control server when the elapsed time exceeds a predetermined threshold time, and said control server includes reception means for receiving a plurality of the temporary routing control tables transmitted by the transmission means of said plurality of routing devices; and control means for controlling the transfer route of said packets by using the plurality of the temporary routing control tables received by said reception means.

6. A routing control server which is connected to a plurality of routing devices for transferring packets on a network and controlling the transfer route of said packets, comprising:

reception means for receiving, in the routing control server, a plurality of temporary routing control tables transmitted from said plurality of routing devices, each of the plurality of temporary routing control tables being generated, by a corresponding routing device of the plurality of routing devices, based on routing related information received from an adjacent routing device;

control means for controlling the transfer route of said packets by using the plurality of temporary routing control tables received by said reception means; update means for updating a first temporary routing control table stored in the routing control server with a second temporary routing control table; and reception notification means for providing a confirmation of receipt of the second temporary routing control table to the routing device that transmitted the first temporary routing control table and the second temporary routing control table, when the first temporary routing control table is updated.

7. A routing control server which is connected to a plurality of routing devices for transferring packets on a network and controlling the transfer route of said packets, comprising:

reception means for receiving, in the routing control server, a plurality of temporary routing control tables transmitted from said plurality of routing devices, each of the plurality of temporary routing control tables being generated, by a corresponding routing device of the plurality of routing devices, based on routing related information received from an adjacent routing device;

control means for controlling the transfer route of said packets by using the plurality of temporary routing control tables received by said reception means;

update timer means for determining an elapsed time since a first temporary routing control table was stored in the routing control server; and update means for updating the first temporary routing control table stored in the routing control server with a second temporary routing control table when the elapsed time exceeds a predetermined threshold time.

8. A routing control method, comprising:

receiving, in each of a plurality of routing devices, routing related information from an adjacent routing device;

generating a temporary routing control table, within each of the plurality of routing devices, based on the received routing related information;

transmitting, by each of the plurality of routing devices, the generated temporary routing control table to a control server;

receiving a plurality of the transmitted temporary routing control tables in the control server;

controlling, using the control server, the transfer route of said packets by using the received plurality of temporary routing control tables;

updating a first temporary routing control table stored in the control server with a second temporary routing control table; and providing a confirmation of receipt of the second temporary routing control table from the control server to the routing device that transmitted the first temporary routing control table and the second temporary routing control table, when the first temporary routing control table is updated in the control server.

9. The routing control method according to claim 8, further comprising:

receiving, by the routing device, the confirmation from the control server; and updating the first temporary routing control table stored in the routing device with the second temporary routing control table, when the confirmation is received from the control server.

10. A routing control method, comprising:

receiving, in each of a plurality of routing devices, routing related information from an adjacent routing device;

generating a temporary routing control table, within each of the plurality of routing devices, based on the received routing related information;

transmitting, by each of the plurality of routing devices, the generated temporary routing control table to a control server;

receiving a plurality of the transmitted temporary routing control tables in the control server;

controlling, using the control server, the transfer route of said packets by using the received plurality of temporary routing control tables;

determining an elapsed time since a first temporary routing control table was stored in the control server; and updating the first temporary routing control table stored in the control server with a second temporary routing control table when the elapsed time exceeds a predetermined threshold time.

11. A routing control method, comprising:

receiving, in each of a plurality of routing devices, routing related information from an adjacent routing device;

generating a temporary routing control table, within each of the plurality of routing devices, based on the received routing related information;

transmitting, by each of the plurality of routing devices, the generated temporary routing control table to a control server;

receiving a plurality of the transmitted temporary routing control tables in the control server;

controlling, using the control server, the transfer route of said packets by using the received plurality of temporary routing control tables;

determining an elapsed time since a first temporary routing control table was stored in the routing device; and transmitting a second temporary routing control table to the control server when the elapsed time exceeds a predetermined threshold time.

* * * * *